March 3, 1970   S. S. FINEBLUM   3,498,074
CONTROL SYSTEM FOR REFRIGERATING APPARATUS
Filed Nov. 23, 1966

INVENTOR
SOLOMON S. FINEBLUM

BY Yount, Raney, Flynn & Tardli
ATTORNEYS

United States Patent Office 3,498,074
Patented Mar. 3, 1970

3,498,074
CONTROL SYSTEM FOR REFRIGERATING
APPARATUS
Solomon S. Fineblum, Silver Spring, Md., assignor to
Ranco Incorporated, a corporation of Ohio
Filed Nov. 23, 1966, Ser. No. 596,563
Int. Cl. F25b 41/00
U.S. Cl. 62—197                 9 Claims

ABSTRACT OF THE DISCLOSURE

The flow of refrigerant in a compressor-condenser-evaporator type of refrigerating system is controlled by a circular vortex chamber connected in the refrigerant return line from the evaporator to the compressor. The flow of refrigerant through the vortex chamber is restricted by imparting rotary motion to the fluid in the chamber and the degree of restriction increases as the rate of rotation of the fluid in the chamber increases. The rotation of fluid in the chamber is created by a control jet stream of refrigerant injected tangentially into the vortex chamber from the high pressure side of the system. The intensity of the control jet is regulated by a valve which is actuated in accordance with the temperature of the medium chilled by the evaporator so as to restrict the return of refrigerant to the evaporator as the temperature of the medium approaches a given temperature.

---

The present invention relates to improvements in refrigerating systems of the compressor-condenser-expander type, and more particularly to improvements in controlling the flow of refrigerant through the evaporators of such systems.

Heretofore it has been the practice to control the flow of refrigerant through the evaporator of a compressor-condenser-expander type refrigerating system by a valve means comprising a valve member movable by a thermostatic element to and from a valve seat in response to changes in the temperature of an area effected by the system to thereby regulate the refrigerating capacity of the evaporator. Such valves are relatively expensive due to the volume of fluid which must be handled thereby, and by reason of the relatively substantial valve actuating force required from the thermostatic element to effect such movement.

A principal object of the present invention is the provision of a new and improved control means for regulating the flow of refrigerant through the evaporator of a refrigerating system which comprises a vortex chamber through which the refrigerant in the system passes as it is drawn to the intake of the compressor, the refrigerant flow control means including a fluid control member to direct a stream of refrigerant into the vortex chamber tangentially thereof and thereby create a vortex to restrict the flow of refrigerant through the vortex chamber, the fluid control member being actuated by a thermally responsive means. In a preferred form of the invention the refrigerant flow control means includes a thermally responsive modulating valve of relatively small capacity, compared to the flow capacity of the vortex chamber, and is adapted to divert refrigerant from the high pressure side of the system into the vortex chamber. Thus, the moving parts of the control means can be of minimum dimensions and can be actuated with a relatively low power, inexpensive thermally responsive element.

Other objects and advantages of the invention will be apparent from the following description of a preferred form of the invention, reference being made to the accompanying drawings wherein.

Figure 1:
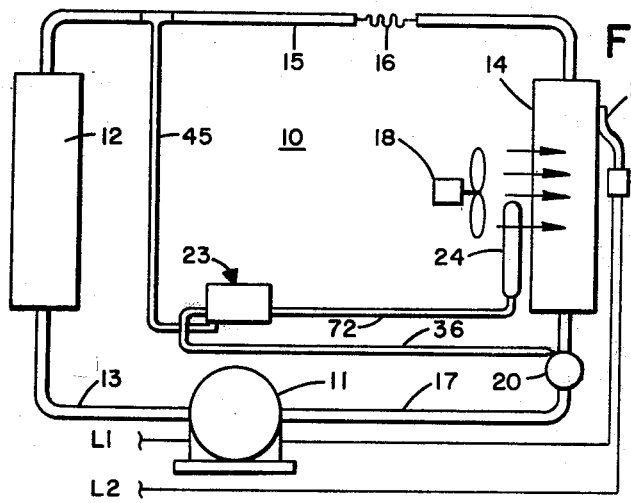
FIG. 1 is a schematic view of a refrigerating system embodying the invention.
Figure 2:
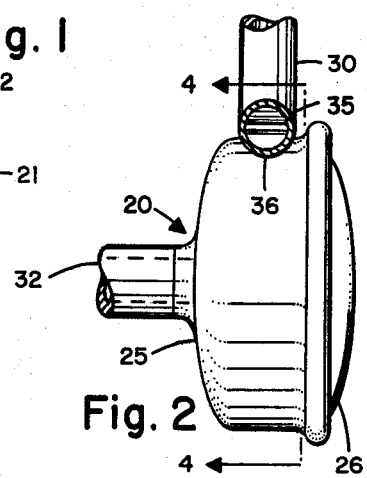
FIG. 2 is a side elevational view of a vortex chamber incorporated in the refrigerating system of FIG. 1, and shown on a larger scale.

Referring to the drawings, the invention is shown incorporated in a compressor-condenser-evaporator type refrigerating system 10 which is, in general, of the conventional construction such as that employed in room air conditioners, for example. The refrigerating system 10 comprises an electric motor driven compressor 11 which is adapted to discharge compressed refrigerant into a condenser 12 by way of a suitable conduit 13. Refrigerant condensed in the condenser 12 is conducted to an evaporator 14 by way of a conduit 15 which includes therein a fluid restricter 16 which consists of a suitable length of capillary tubing, as is conventional practice. The outlet of the evaporator 14 is connected to the intake of the compressor 11 through a conduit 17 and which, according to the present invention, includes a vortex chamber 20. The system 10 operates in the well known manner in which the refrigerant is compressed by the compressor 11, condensed in the condenser 12 and the condenser refrigerant passed to the evaporator 14 wherein it is evaporated when subject to the suction of the intake of the compressor 11. An electric motor driven fan 18 is arranged to force air over the evaporator which is discharged into a space to be cooled.

In the form of the invention shown, the motor for driving the compressor 11 is energized by a convenient electrical circuit including lines L1, L2 and a conventional thermostatically actuated switch mechanism 21 is connected in series circuit with the compressor motor to close the motor circuit when the temperature of a thermostatic bulb 22 adjacent the evaporator 14 reaches a predetermined high temperature and opens the circuit when the temperature of the evaporator falls to a predetermined low.

In accordance with the present invention, the refrigerating capacity of the evaporator 14 is regulated in response to temperatures adjacent the evaporator by a fluid control system including the vortex chamber 20 and a modulating valve 23 which is actuated in accordance with temperatures at a thermostatic bulb 24.

Referring particularly to FIGS. 2 through 5, the vortex chamber 20 comprises a cup-shape shell member or chamber 25, the open side of which is closed by a cover 26 suitably attached thereto in fluid sealing relationship. For example, the open edges of the cup-shape member 25 may be rolled over the peripheral edges of the cover 26 and sealed with a suitable solder. An inlet opening 27 is formed in one side wall of the member 25 and a section 30 of the conduit 17 is secured in the opening 27, as by brazing. An outlet opening 31 is formed in the end wall of the member 25 and is co-axial with the cylindrical walls of the cup-shape member. A portion 32 of the conduit 17 is suitably sealingly secured to the shell 25 in the outlet opening 31 and the flow of refrigerant through the shell member from inlet 27 to outlet 31 is relatively unrestricted when no vortex is present within the shell, as is described hereinafter, and the flow of refrigerant will be somewhat like that shown by the arrows in FIG. 4. When a vortex is formed in the shell 25, that is to say, by causing a swirling of the fluid about the interior of the shell 25 as it enters inlet 27, the flow of refrigerant through the shell to the outlet 31 is restricted to a degree which relates to the rate of rotation of he swirling fluid within the shell.

In accordance with the present invention the rate of rotation of the vortex, if any, within the chamber 25 is controlled by the valve 23 according to the temperature at the bulb 24. When the temperature increases from a given value, the vortex rate is diminished or no vortex is established in the chamber 25, and as the temperature decreases the rate of rotation of the vortex is increased, thereby restricting flow of refrigerant through the evaporator to reduce its cooling effect.

Figure 5:
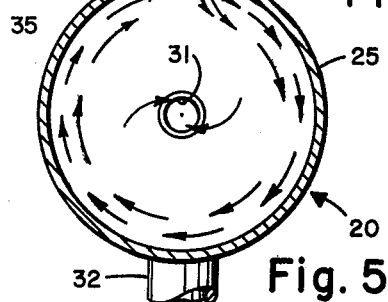
FIGS. 4 and 5 are sectional views taken along line 4—4 of FIG. 2.
Figure 4:
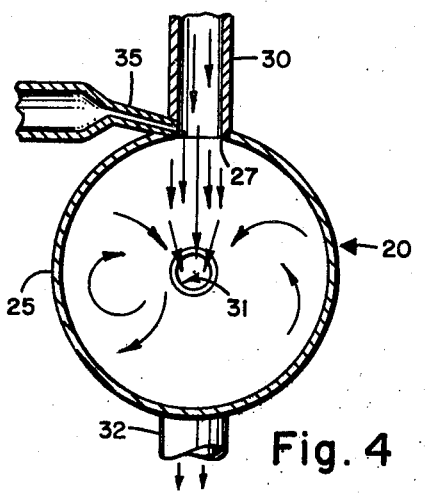

The vortex in the shell or chamber 25 is controlled by the introduction of refrigerant from the high pressure side of the system into the chamber through the valve 23 and an inlet nozzle or jet 35 which is comprised of an end section of a suitable tube 36 flattened at an end which is secured in a slot-like opening in the cylindrical side of the chamber 25 adjacent one side of the inlet opening 27. The other end of the tubs 36 is connected with the outlet of the valve 23, as is explained more fully hereinafter. The flattened portion 35 of the tube 36 provides a wide thin jet of refrigerant, which is directed into the chamber 25 tangentially of the cylindrical chamber wall adjacent the opposite side of the inlet opening 27 from the nozzle outlet, as is illustrated in FIG. 5 by arrows 37. The swirling refrigerant in the chamber 25 materially impedes the flow thereof to the outlet opening 31 and the amount of refrigerant withdrawn from the evaporator by the compressor is materially reduced, depending upon the velocity of the rotating refrigerant.

Figure 6:
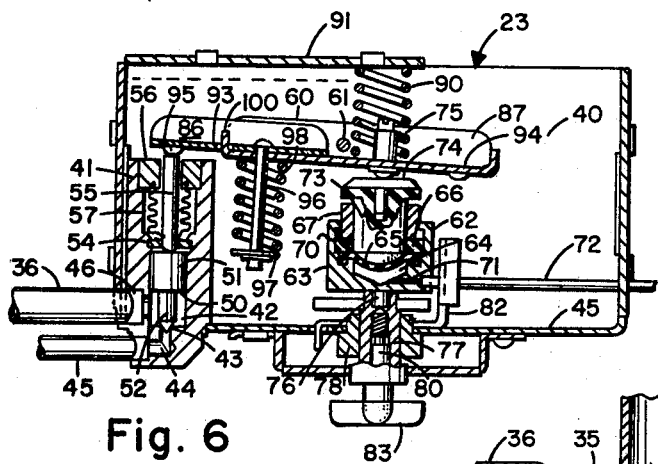
FIG. 6 is a longitudinal sectional view of a modulating valve shown in the refrigerating system of FIG. 1, but on a larger scale.
Figure 3:
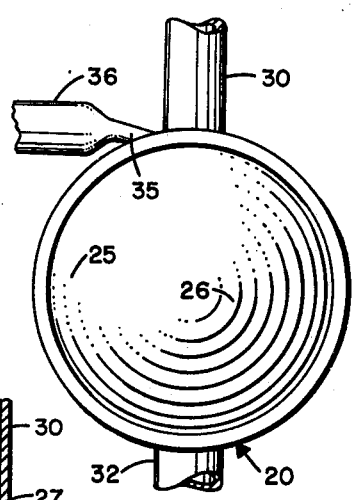
FIG. 3 is a front elevational view of the vortex chamber shown in FIG. 2.

As mentioned, the flow of vortex producing refrigerant to the chamber 25 through the nozzle 35 is controlled by the modulating valve 23 which is shown in more or less detail in FIG. 6. The modulating valve comprises a suitable frame 40, which may be made of sheet metal, and a cylindrical valve body 41 is supported on the inside of the frame at one end thereof, and the lower end extends beyond the frame. The cylindrical valve body 41 has an axial bore 42 therein which terminates short of the lower end of the body and which is enlarged adjacent the lower end to provide a valve seat or portion 43. A transverse bore 44 provides communication between the end of the bore 42 and the end of a tube 45, which is brazed in the bore 44, as shown. The tube 45 is tapped into the conduit 15 between the condenser 12 and the restrictor 16 so that liquid refrigerant under high pressure is directed into the lower end of bore 42 during the time the compressor is operting.

A second cross bore 46 is formed in the body 41 and enters the bore 42 slightly above the valve seat 43 and forms an outlet in which one end of the tube 36 is attached, as by brazing. The other end of the tube 36 forms the nozzzle 35 for the vortex chamber 25 as described hereinbefore.

A valve member 50 is adapted to reciprocate in the bore 42 and it comprises a piston section 51 which closely fits in the walls of the bore and has a stem 52 projecting from the lower end thereof which is tapered and adapted to close on the port 43.

A guide disc 54 is secured transversely of the bore 42 above the piston 51 and forms a stop for limiting upward movement of the valve member 50 from the port 43. An actuating pin 55 extends through an axial opending in the disc 54 and engages the top of the valve member 50 for depressing the valve to close the same against the pressure in the bore beneath the valve member 51. The upper end of the actuator pin 55 extends through a guide bushing 56 which is secured in the upper end of the bore 42. To prevent the escape of refrigerant through the space between the pin 55 and the walls of the opening in the bushing 56 through which the rod extends, a flexible metallic bellows-type sleeve 57 surrounds the pin 55 and the lower end thereof is sealingly attached to the pin, while the upper end is secured to the underside of the bushing 56 about the central opening therethrough. It will be appreciated that the sleeve 57 permits longitudinal movement of the pin 55 without leakage of refrigerant from the valve bore.

It will be appreciated that when the refrigerating system is operating, the pressure beneath valve member 50 is above atmospheric and will urge the valve from the port 43.

The pin 55 is adapted to be depressed to close the valve member 50 on the port 43 by a thermostatic mechanism which includes a lever assembly 60 which is pivoted on a pin 61 supported in the frame 40 and is actuated by expansion and contraction of a thermally responsive power element 62.

The power element 62 may be of any well-known construction and in the form shown it comprises a metal body 63 having a cylindrical recess 64 therein, one end of which is closed by a rubber diaphragm 65. The edges of the diaphragm 65 are retained in an annular groove about a shoulder on the body 63 formed by enlargement of the recess 64 and is secured in place by a washer 66 and an end of a sleeve 67 which are pressed to the body. The sleeve 67 is attached to the body 63 by the upper edges of the body which roll over against an annular shoulder 70 formed on the sleeve by the reduction of the outside diameter thereof. The recess 64 contains a suitable liquid, the volume of which is increased and decreased by movement of liquid to and from the recess through a transverse bore 71 in communication with the recess and which is connected with a capillary tube 72, one end of which is secured in the end of the bore. The opposite end of the tube 72 is connected with the bulb 24, and the bulb, tube and recess 64 are filled with the thermally expansible liquid.

A plunger 73 slides in the sleeve 67 and one end engages the rubber diaphragm 65. The outer end of the plunger 73 is recessed to receive a stem on a cap 74 which engages a screw 75 threaded through a sleeve integral with the lever assembly 60. As is explained hereinafter, the lever assembly 60 is normally biased against the cap 74 and when the volume of liquid in the recess 64 expands or contracts the plunger 73 moves axially to control movement of the lever assembly 60 about its pivot pin 61. When the temperature at the bulb 24 increases, the volume of liquid in the recess 64 is increased to move the valve member 50 to the port 43, and when the temperature at the bulb 24 decreases the volume of liquid in the recess decreases and the pressure on the plunger 73 urges the plunger inwardly of the recess which permits the valve member to open the port.

To provide adjustment of the position of the power element 62 relative to the lever assembly 60, the body 63 includes the stem 76 which is slidingly received in a bore in one end of a sleeve 77 which is secured in a bushing 78 attached to the bottom wall 45 of the frame 40. A stem 80 is threaded in the sleeve 77 and the inner end engages the stem 76 to provide an adjustable stop for the stem 76 thereby positioning the body 63 relative to the lever 60. A bracket 82 is secured to the bushing 78 and bottom wall 45 in the manner shown, and includes a forked section through which the tube 72 is received and which prevents rotation of the body 63. A knob 83 is attached to the stem 80 for rotation of the latter, and by rotating the knob the body 63 is moved axially so that more or less expansion of the liquid in the recess 64 is required to cause a given movement of the lever assembly 60 in accordance with a given change in temperature at the bulb 24. Preferably, the angle of rotation of the knob 83 is limited by suitable means, not shown.

The lever assembly 60 is comprised of two channel-shaped nested members 86, 87. The member 87 is pivoted on the pin 61, the ends of which are supported in opposite sides of the frame 40 (only one of which sides appears in the drawings), and the pin extends through openings in the opposite channel sides of the member, only one side of which appears. A coil spring 90 is interposed between the bottom wall of channel member 87 and an upper plate 91 which is suitably attached to the frame 40. The spring 90 maintains the lever assembly 60 biased against the plunger cap 74 so that the member 87 swings about the pin 61 and follow movements of the plunger 73 according to changes in volume of the liquid in the recess 64. The channel-shaped member 86 has its bottom wall 93 thereof overlying the left hand end section of the wall 94 of the member 87 and the side channels thereof nest within the side channels of the member 87. Only one side of the channel-shaped member 86 appears in the drawing. A portion of the member 86 extends beyond the member 87 and has a boss 95 which engages the end of the pin 55.

It is desirable that the lever assembly 60 yield after the valve member 50 has closed on port 43 and to provide for this yielding, the abutting portions of the walls 93–94 are resiliently held together by a pin 96 which extends through aligned openings through the two walls and which has a washer 97 fixed adjacent the end thereof which forms an abutment against which a coil spring 98 reacts, the opposite end of the spring engaging the under side 93 of member 87. An upturned tongue 100 formed on the wall 94, projects through a slot in the wall 93 of the member 86 to maintain alignment of the lever members 86 and 87. It will be apparent that when the member 87 is rotated counterclockwise by the thermally responsive element 62, the rod 55 will be depressed and close the stem 52 on the valve port 43. Further movement of the power element 62 which is apt to occur by overshooting of temperatures at the bulb 24, results in separation of the wall 94 of member 87 and the wall 93 of member 86 against the force of the spring 98 tending to hold the two walls of the members together. By this arrangement, excessive forces on the various parts are avoided to prevent rupture or deformation thereof.

Preferably, the thermally responsive element 62 is set to open and close the valve port 43 in response to decreases and increases respectively of the temperature at the bulb 24 within the range at which the switch 21 is set to start and stop the compressor 11.

The operation of the system is as follows:

Assuming that the temperature of the bulb 24 is high relative to that desired, the power element 62 will have rotated the lever assembly 60 counterclockwise to close off the port 43 and hence no refrigerant will flow through the tube 36 to the vortex chamber 25 and refrigerant fluid will be withdrawn from the evaporator and enter the intake of the compressor 11 through conduit 17 with little, if any, resistance by the vortex chamber. With this full flow of refrigerant from the evaporator to the compressor, maximum refrigeration will be effected in the evaporator 14. Should the temperature at the bulb 24 commence to fall below that desired, the plunger 73 of the power element 62 will be depressed by the spring 90 acting through the lever assembly 60, causing clockwise rotation of the lever assembly and permit opening of the valve port 43 by the member 50. It will be seen that the pressure drop through the valve body 41 is equal to that of the drop between the high and low side of the refrigerating system and liquid refrigerant will be forced through the tube 36 at a relatively high velocity and will be discharged through the nozzle 35 into the chamber 25 tangentially of the chamber to produce the vortex effect indicated by the arrows in FIG. 5. This vortex action establishes a resistance to the flow of refrigerant through the outlet 31 and hence a lesser amount of refrigerant is evaporated in the evaporator 14, which results in less heat absorption. A continued reduction in the temperature at the bulb 24 results in a further opening of the valve port 43 which increases the rate of discharge from the nozzle 35 into the vortex chamber and consequently the restriction to the flow of refrigerant into the outlet 31 is increased, thereby further reducing the rate of flow of refrigerant from the evaporator. Continued reduction in temperature at the bulb 24 after the valve port 43 has been fully opened will cause the thermostatic switch 21 to open the compressor motor circuit and discontinue operation of the compressor until the temperature at the evaporator rises to the cut-in point of the thermostatic switch.

It will be seen that the amount of refrigerant flowing through the valve body 41 to form the vortex in the chamber 25 is relatively small as compared with a valve capable of directly controlling the main flow of refrigerant through the system and that considerable savings in costs of thermostatically actuated flow control means is effected.

While I have described but one form of the invention, it is to be understood that other forms, modifications and adaptations could be made, all falling within the scope of the claims which follow.

I claim:

1. A refrigerating system comprising a compressor, a condenser, evaporator and fluid conduit means connecting said compressor, condenser and evaporator in a refrigerator circuit, a fluid interacting chamber in said fluid conduit means, said chamber comprising circular side walls and having a refrigerant inlet in a side wall thereof for directing refrigerant passing through said circuit into said chamber in a direction radially of said circular side walls, and a refrigerant outlet in an end wall of said chamber and axially disposed relative to said circular side walls, and means for admitting a stream of refrigerant tangentially into said chamber.

2. A refrigerating system as set forth in claim 1 wherein said chamber comprises a cylindrical chamber having said conduit means connected with an opening in a cylindrical side thereof for admitting refrigerant passing through said circuit into said chamber in a direction radially of said chamber, and said conduit means communicating with said chamber in an end wall thereof and axially of said chamber, and means for admitting a jet stream of refrigerant tangentially into the cylindrical side of said chamber and adjacent said opening in said side of said chamber.

3. A refrigerating system as set forth in claim 2 in which the jet of refrigerant directed into said chamber is directed from the high pressure side of the system.

4. A refrigerating system as set forth in claim 2 in which said chamber is in said conduit means between said evaporator and said compressor.

5. A refrigerating system as set forth in claim 2 wherein means for directing said jet of refrigerant into said chamber includes a modulating valve.

6. A refrigeration system as set forth in claim 2 wherein the conduit means connected with said opening in said side is connected with the outlet of said evaporator and said conduit means connected with said opening in said end wall is connected with the intake of said compressor.

7. A refrigerating system as set forth in claim 5 in which the jet of refrigerant directed into said chamber is directed from the high pressure side of the system.

8. A refrigerating system as set forth in claim 5 wherein means for directing said jet of refrigerant into said chamber includes a modulating valve.

9. A refrigerating system as set forth in claim 5 wherein means for directing said jet of refrigerant into said chamber includes a thermostatically operated valve.

References Cited

UNITED STATES PATENTS

| 2,461,876 | 2/1949 | Boyle | 62—525 |
| 2,519,010 | 8/1950 | Zervfoss | 62—500 XR |
| 2,813,404 | 11/1957 | Hirsch | 62—471 |
| 3,369,374 | 2/1968 | Miller | 62—197 |

MEYER PERLIN, Primary Examiner

U.S. Cl. X.R.

62—217